United States Patent [19]

Hanson

[11] 4,448,925

[45] May 15, 1984

[54] INJECTION MOLDABLE POLYMERS CONTAINING PHTHALIC ANHYDRIDE

[75] Inventor: Robert B. Hanson, Oswego, Ill.

[73] Assignee: Standard Oil Company (Indiana), Chicago, Ill.

[21] Appl. No.: 406,110

[22] Filed: Aug. 6, 1982

[51] Int. Cl.³ .................... C08G 69/04; C08G 69/26; C08G 73/14; C08L 77/10
[52] U.S. Cl. .................................. 524/600; 524/606; 524/726; 528/188; 528/189
[58] Field of Search .................. 524/600, 606, 726; 528/188, 189

[56] References Cited

U.S. PATENT DOCUMENTS

| | | | |
|---|---|---|---|
| 3,347,828 | 10/1967 | Stephens et al. | 528/188 |
| 3,444,183 | 5/1969 | Hubbuch | 524/233 |
| 3,494,890 | 2/1970 | Morello | 528/179 |
| 3,573,260 | 3/1971 | Morello | 528/188 |
| 3,661,832 | 5/1972 | Stephens | 528/352 |
| 4,016,140 | 4/1977 | Morello | 528/188 |
| 4,118,364 | 10/1978 | Nielinger et al. | 524/404 |
| 4,136,085 | 1/1979 | Hanson | 528/189 |
| 4,224,214 | 9/1980 | Chen | 524/423 |
| 4,309,528 | 1/1982 | Keske et al. | 528/189 |
| 4,313,868 | 2/1982 | Hanson | 528/188 |

FOREIGN PATENT DOCUMENTS

WO81/02014  7/1981  PCT Int'l Appl. ................ 528/189

*Primary Examiner*—Ronald W. Griffin
*Attorney, Agent, or Firm*—Gunar J. Blumberg; William T. McClain; William H. Magidson

[57] ABSTRACT

Novel copolymers and molding compositions are prepared from acyl halide derivatives of dicarboxylic acids, acyl halide derivatives of tricarboxylic aromatic anhydrides and aromatic diamines and about 1 to about 10 percent by weight of phthalic anhydride moieties. Also, glass filled copolymers are prepared. The copolymers are useful as engineering plastics.

19 Claims, No Drawings

INJECTION MOLDABLE POLYMERS CONTAINING PHTHALIC ANHYDRIDE

BACKGROUND OF THE INVENTION

1. Field of the Invention

The field of this invention relates to glass filled polyamide-imide phthalamide copolymers containing about 1 to about 10 percent phthalic anhydride prepared in an organic solvent, and to molding powders and molded articles prepared therefrom. More particularly, the field of this invention relates to glass filled polyamide-imide isophthalamides comprising about 1 to about 10 percent phthalic anhydride.

2. Background

Amide-imide polymers are a relatively new class of organic compounds known for their solubility in nitrogen-containing organic solvents when in the largely polyamide form. The major application of the amide-imide polymers has been as wire enamels. This is illustrated in U.S. Pat. Nos. 3,661,832 (1972); 3,494,890 (1970); and 3,347,828 (1967).

Compositions prepared from isophthalic acid and diamines and aliphatic diamines have found application in coatings and films. The prior art on this is summarized in U.S. Pat. No. 3,444,183 (1969).

Reinforced polyhexamethylene isophthalamides have been used to produce articles as disclosed in U.S. Pat. No. 4,118,364 (1978). However, the physical properties of these reinforced polyhexamethylene isophthalimides are insufficient for use in engineering plastics since their tensile strength and the continuous service temperature do not meet those required for engineering plastics.

U.S. Pat. No. 4,313,868, discloses copolymers and molding compositions prepared from acylhalide derivatives of dicarboxylic acids, acylhalides of tricarboxylic aromatic anhydrides and aromatic diamines. That reference also discloses glass-filled copolymers. These products, useful as engineering plastics, have a tendency to have flow problems. These problems are overcome when about 1 to about 10 percent phthalic anhydride is added to the polymer.

U.S. Pat. No. 4,136,085 discloses that the addition of phthalic anhydride to compositions based on the acylhalide derivative of trimellitic anhydride and diamines did not improve the flow properties of the polymer. Applicant has discovered that when phthalic anhydride is added to his polymer, the flow is greatly improved.

The general object of this invention is to provide amide-imide and polyamide copolymers comprising about 1 to about 10 percent phthalic anhydride moieties. A more specific object of this invention is to provide amide-imide and polyamide copolymers comprising about 1 to about 10 percent phthalic anhydride reinforced with glass fibers, glass beads and mixtures thereof. A more specific object of this invention is to provide a process for incorporating 1 to about 10 percent phthalic anhydride into polyamide-imide polyamide copolymers. Another object is to provide amide-imide and amide polymers prepared from aromatic diamines and mixtures of an acylhalide derivative of an aromatic tricarboxylic anhydride and an acylhalide derivative of an aromatic dicarboxylic acid and about 1 to about 10 percent phthalic anhydride wherein said polymer contains from about 30 to about 60 weight percent glass fibers, glass beads, or mixtures of these. Other objects appear hereinafter.

I have now found that improved amide-imide amide copolymers can be obtained by reacting acylhalide derivatives of benzene tricarboxylic anhydride and acylhalide derivatives of aromatic dicarboxylic acids with aromatic diamines and about 1 to about 20 percent phthalic anhydride. I have also discovered that these polymers comprising about 1 to about 10 percent phthalic anhydride can be filled with from about 30 to about 60 weight percent with glass fibers, glass beads, or a mixture thereof. Suitably, the aforementioned molding compositions may contain from about 30 to about 50 weight percent of glass fibers, glass beads, or a mixture thereof. Our studies have shown that if the teachings of U.S. Pat. No. 4,313,868 are followed specifically in Example 2, great care must be taken in processing this trimellitic anhydride capped resin, as heat treatment of the polymer at about 450° to about 470° F. for periods greater than two hours will yield material having a zero melt flow at 650° F., ⅛ inch die and 5,000 psi. Pellitization and injection molding of the polymer will yield greater cavity pressure and injection molding cycle times are less than 40 seconds. Injection molding of the polyamide-imide amide polymer with about 1 to about 10 percent by weight phthalic anhydride in place of the 2 percent trimellitic acid used in Example 2 of U.S. Pat. No. 4,313,868 shows a substantial improvement in the melt flow values and stability of the polymer. Compositions comprising up to 60 percent by weight glass fiber show an improvement in cavity pressure and injection molding cycle when the polymer comprises about 1 to about 10 percent phthalic anhydride compared to polymers not having any phthalic anhydride moieties.

Our studies have shown that fully aromatic amide-imide polymers are very expensive and need special injection molding equipment capable of withstanding injection molding temperatures in the range of 600° to 700° F. at the molding pressure in excess of 20,000 pounds per square inch. Our novel amide-imide amide copolymer comprising about 1 to about 10 percent phthalic anhydride and glass filled copolymers are much more economical than conventional polyamide-imide copolymers disclosed in U.S. Pat. Nos. 4,016,140 (1977) and 3,573,260 (1971) and yet retain the same thermal and mechanical properties of the copolymers disclosed in the aforementioned patents. This is a significant advance in the art and is wholly unexpected.

The use of polyamide-imide polymers are engineering plastics has been limited only by their relatively high cost. Thus, when the inherent cost can be brought down, the commercial application of these polymers will be greatly expanded. The copolymers of this invention have large cost advantages over the prior art compositions and thus promise to expand the commercial applications of these polymers.

The copolymers of this invention are prepared by reacting a mixture of an acyl halide derivative of an aromatic tricarboxylic acid anhydride and acyl halide derivatives of aromatic dicarboxylic acids with aromatic diamines.

The novel injection moldable copolymers of this invention comprise recurring polyamide A units of

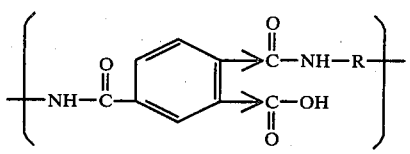

which are capable of undergoing imidization and polyamide B units of

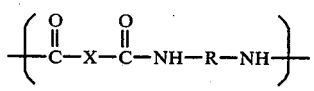

wherein the molar ratio of A units to B units is about 80 to 20 to 20 to 80, preferably 1 to 1 and wherein R is a divalent aromatic hydrocarbon radical of from about 6 to about 20 carbon atoms or two divalent hydrocarbons joined directly or by stable linkages selected from the group consisting of —O—, methylene, —CO—, —SO₂—, and wherein X is a divalent aromatic radical and →denotes isomerization and wherein the copolymer comprises about 1 to about 10 percent by weight of phthalic anhydride moieties.

In the injection molded form, the polyamide A units have converted to the polyamide-imide A' units and the copolymer is comprised of recurring polyamide-imide A' units of

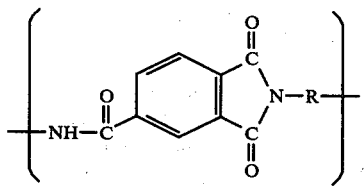

and polyamide B units of

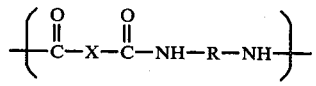

wherein the molar ratio of A' to B units is about 80 to 20 to 20 to 80, preferably 1 to 1, and wherein R and X are defined as above and wherein the copolymer comprises about 1 to about 10 percent by weight of phthalic anhydride moieties.

The copolymers of this invention are prepared from acyl halide derivatives of dicarboxylic acid such as isophthalic acid or terephthalic acid and an anhydride-containing substance and aromatic diamines. Useful acyl halide derivatives of dicarboxylic acid include

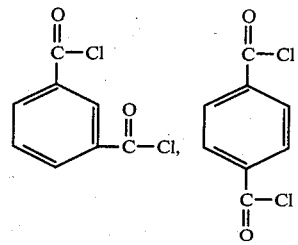

and related compounds. Suitably, the anhydride-containing substance is an acyl halide derivative of the acid anhydride having a single benzene or lower acyl-substituted benzene ring. The preferred anhydride is four acid chloride of trimellitic anhydride (4 TMAC).

Useful aromatic diamines include para- and meta-phenylenediamine, oxybis (aniline), thiobis (aniline), sulfonylbis (aniline), diaminobenzophenone, methylenebis (aniline), benzidine, 1,5-diaminonaphthalene, oxybis (2-methylaniline), thiobis (2-methylaniline), and the like. Examples of other useful aromatic primary diamines are set out in U.S. Pat. No. 3,494,890 (1970) and U.S. Pat. No. 4,016,140 (1977) both incorporated herein by reference. The preferred diamine is meta-phenylenediamine.

I have found that the polyamide-imide amide copolymers are improved by the addition of reinforcing material; particularly the mechanical properties of the copolymers are improved if these copolymers contain from 30 to 60 percent by weight glass fibers, glass beads or a mixture thereof. In the preferred range the copolymers contain 30 to 40 percent by weight of the glass reinforcing material, glass fibers, glass beads, or a mixture thereof. Suitable reinforcing materials can be glass fibers, glass beads, glass spheres, glass fabric. The glass fibers are made of alkali-free boron-silicate glass (E-glass) or alkali-containing C-glass. The thickness of the fibers is preferably on average between 3 μm and 30 μm. It is possible to use both long fibers with an average length of from 5 to 50 mm and also short fibers with an average filament length of from 0.05 to 5 mm. In principle, any standard commercial-grade fibers, especially glass fibers, may be used. Glass beads ranging from 5 μm to 50 μm in diameter may also be used as reinforcing material.

The reinforced polyamide-imide amide copolymers may be prepared in various ways. For example, so-called rovings, endless glass fiber strands, are coated with the polyamide melt and subsequently granulated. The cut fibers or the glass beads may also be mixed with granulated polyamide and the resulting mixture melted in a conventional extruder, or alternatively the fibers may be directly introduced into the polyamide melt through a suitable inlet in the extruder.

Injection molding of the novel glass-filled polymer is accomplished by injecting the copolymer into a mold maintained at a temperature of about 300° to 450° F. In this process a 25 to 28 second cycle is used with a barrel temperature of about 600° to 650° F. The injection molding conditions are given in Table I.

TABLE I

| | |
|---|---|
| Mold Temperature | 350° F. to 450° F. |
| Injection Pressure | 15,000 to 19,000 psi and held for 1 to 3 seconds |
| Back Pressure | 100 to 220 psi |
| Cycle Time | 25 to 28 seconds |

TABLE I-continued

| | |
|---|---|
| Extruder: | |
| Nozzle Temperature | 600° F. to 630° F. |
| Barrels: | |
| Front heated to | 600° F. to 630° F. |
| Screw: | |
| 20 to 25 revolutions/minute | |

The mechanical properties of the polymers prepared in the Examples are given in Tables 2, 3, and 4 and show that these polymers have excellent mechanical and thermal properties.

Cavity pressure measurements are used as quality control checks of polyamide-imide resin viscosity. Pressure buildup during the filling of an injection molded part is measured at a point in the cavity (ejector pin). This is accomplished by placing a pressure transducer behind the ejector pin and recording the pressure with a chart recorder or other readout device. Cavity pressure normally rises as the mold is being filled and peaks as the molten resin is packed into the cavity. As the resin solidifies, cavity pressure decreases.

We have found that resins that have low cavity pressure process poorly and that spiral flow measurements were not sensitive enough to discriminate between resins in the viscosity range of interest. Low cavity pressures indicate a large pressure drop between injection and cavity pressures. This indicates higher resin viscosities. In the same manner, high cavity pressures indicate less pressure change between injection and cavity pressures, suggesting lower resin viscosities.

Amide-imide polymer and copolymer viscosities had been measured by spiral flow determinations previous to the implementation of the cavity pressure procedure, see U.S. Pat. No. 4,224,214. Cavity pressure was selected over spiral because of its greater sensitivity. The cavity pressure test has been implemented as an amide-imide homopolymer and copolymer quality control procedure. Like spiral flow, cavity pressure is a test that can be done conveniently in a molder's shop.

Resins were dried in a vacuum (2 mm Hg) oven at 300° F. for at least 16 hours before testing. Moisture in amide-imide homopolymer copolymers has a very significant effect on its flow properties, therefore special care was taken to be sure the samples were properly dried. This drying procedure was used before making flow rate and cavity pressure measurements.

The flow rate procedure was patterned after the standard method described in ASTM D1238. I used a 335° C. (635° F.) barrel temperature with a 30 minute preheat time. This is about the largest set of weights that can be used safely with the standard extrusion plastometer apparatus. I used a standard 0.0825 in. diameter, and a 0.315 in. long orifice.

Special care was taken to be sure that each flow rate measurement was started when an equivalent volume of resin was in the barrel. Previous rheology work indicated that there is a very large "barrel height" effect on amide-imide homopolymers and copolymers. Each flow rate measurement was initiated while the top of the piston collar was between the two scribe marks on the piston. This precaution is also required by ASTM in method D1238.

In a preferred embodiment, 1 mole meta-phenylenediamine is dissolved in a nitrogen-containing solvent such as dimethylacetamide or N-methylpyrolidone and about 1 to about 10 percent by weight phthalic anhydride is added. A mixture of the 4-acid chloride of trimellitic anhydride and the acid chloride form of isophthalic acid in a molar ratio of 1 to 1 is added to the diamine solution over two hours at about 25°-35° C. The isophthalic anhydride and the 4-acid chloride of trimellitic anhydride may be either dry blended or molten. The viscous solution is then heated at about 50° C. for one hour and the polymer is recovered by precipitation into water. The product is washed thoroughly and dried to a solids content in excess of 96%. The polymer is then dry blended with glass fiber, pelletized and injection molded under molding conditions as set forth in Table I. The mechanical properties of the copolymer are given in Tables 2, 3, and 4.

The following Examples illustrate the preferred embodiments of this invention. It will be understood that these Examples are for illustrative purposes only and do not purport to be wholly definitive with respect to the conditions or scope of the invention.

EXAMPLE 1

Glass Content 30%

A 10 gal glass-lined Pfaudler kettle equipped with a water-cooled jacket and nitrogen inlet was charged with 9.87 lbs. of m-phenylenediamine, 0.35 lbs of trimellitic anhydride and 59.2 lbs of N-methylpyrrolidone. After solution had occurred under a nitrogen purge, an intimate blend of 9.52 lbs of 4-trimellitoyl anhydride chloride and 9.17 lbs of isophthaloyl dichloride was added over 2.5 hrs keeping the temperature below 35° C. The resulting viscous solution was brought to 50° C. When the Gardner viscosity had reached a Z1 viscosity the solution was precipitated by passage through a Fitzpatrick comminuting mill. The polymer product was washed five times with deionized water followed by air-drying on a filter for 3 days. The product was then brought to a solids content of >98% by heating in a forced air oven for 2 hrs at 470° F. The 23.2 lbs of polymer were blended with 10 lbs of PPG 3531 ⅛ glass fiber and 0.34 lbs of PTFE and pellitized on a Columbo RC-9 twin screw extruder. The pilled product was injection molded on a Stokes injection molding machine. The physical properties are shown in Table 2 below.

TABLE 2

| | | |
|---|---|---|
| Glass Content, % | | 30 |
| Injection Molding Temperature, °F. | | 600 |
| As Molded Properties | ASTM Method | |
| Tensile psi | D-638 | 13,000 |
| Elongation, % | D-638 | 2.4 |
| Tensile Modulus, psi | D-638 | 755,000 |
| HDT, °F. | D-48 | 482 |
| Izod, ft-lbs/in. of notch | D-252 | 1.13 |
| Density g/cm$^3$ | | 1.70 |

EXAMPLE 2

To a solution of m-phenylene diamine and between 1 and 10% phthalic anhydride in N-methyl pyrrolidone is added an intimate mixture of 4-trimellitoyl anhydride chloride and isophthaloyl dichloride (49/49 to 45/45) over a period of 2-3 hrs at 25°-40° C. The viscous polymer solution is heated at 50° C. for 1 hr then precipitated into water using a Waring Blender. The product is given 6 water washes, dried in a vac. oven at 80° C. (to 90% solids), then further heat treated for 6 to 24 hrs at 450° F. The polymer is compounded with 40% chopped glass fiber, 0.5% PTFE and pelletized on a twin screw extruder.

TABLE 3
TMA/IPA - MPDA POLYMER

| RUN NO. | % TMA | % PA | POLYMER IV[1] 6 HR[2] | 24 HR[2] | MELT FLOW[3] 6 HR[2] | 24 HR[2] |
|---|---|---|---|---|---|---|
| 01119U | 2 | — | .24 | .28 | 0 | 0 |
| −169 | — | 1 | .40 | .41 | 20 | 20 |
| −10 | — | 3 | .37 | .38 | 189 | 78 |
| −14 | — | 6 | .32 | .36 | ~700 | ~700 |
| −16 | — | 9 | .25 | .27 | >700 | >700 |
| 11016U | — | 1 | .38 | .38 | 700 | 700 |

[1]0.5% in NMP (25° C.)
[2]Heat treatment at 450° F.
[3]650° F., ⅛" die, 5000 psi

TABLE 4
PROPERTIES* - TMA/IPA - MPDA POLYMER 40% GLASS FILLED

| | ASTM Method | 01119U | 11016U |
|---|---|---|---|
| Tensile Strength | D-638 | 33,600 psi | 31,200 psi |
| % Elongation | D-638 | 4.2 | 6.2 |
| Flex. Modulus | D-790 | 2.11 × 10⁶ psi | 2.1 × 10⁶ psi |
| Flex. Strength | D-790 | 54,200 psi | 52,600 psi |
| HDT | D-48 | 546° F. | 552° F. |
| IZOD, ft.-lbs/in. of notch | D-256 | 1.14 | 1.38 |

*Annealed

I claim:

1. An injection moldable polyamide copolymer comprising about 1 to about 10 percent phthalic anhydride moieties and comprising recurring polyamide A units of

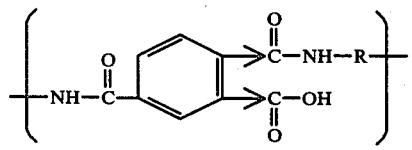

capable of undergoing imidization wherein → denotes isomerization and polyamide B units of

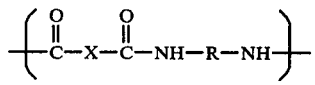

wherein the molar ratio of A units to B units is about 80 to 20 to 20 to 80, and wherein R is a divalent aromatic hydrocarbon radical of from 6 to about 20 carbon atoms or 2 divalent hydrocarbon radicals of from about 6 to 20 carbon atoms joined directly or by stable linkages selected from the group consisting of —O—, methylene, —CO—, —SO₂—, and —S— radicals and X is a divalent aromatic radical.

2. The copolymer of claim 1 wherein the molar ratio of A units to B units is about 1 to 1.

3. A polyamide molding composition comprising about 1 to about 10 percent phthalic anhydride moieties suitable for injection molding comprising recurring polamide A units of

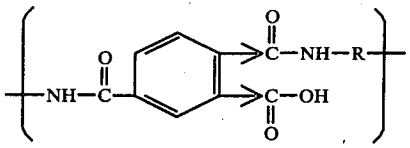

capable of undergoing imidization wherein → denotes isomerization and polyamide B units of

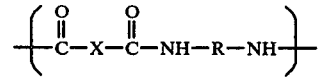

wherein the molar ratio of A units to B units is about 80 to 20 to 20 to 80 and the molding composition contains from about 30 to 50 weight percent of glass fibers, glass beads or a mixture thereof and R is a divalent aromatic hydrocarbon radical of from 6 to about 20 carbon atoms or 2 divalent hydrocarbon radicals of from about 6 to about 20 carbon atoms joined directly or by stable linkages selected from the group consisting of —O—, methylene, —CO—, —SO₂— and —S— radicals and X is a divalent aromatic radical.

4. The composition of claim 3 wherein R is

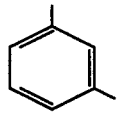

and X is

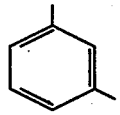

5. Shaped article comprising reinforced polyamide copolymer as claimed in claim 3.

6. The polyamide molding composition of claim 3 wherein the molding composition contains from about 30 to about 60 weight percent of fibers, glass beads or a mixture thereof.

7. A shaped article comprising reinforced polyamide copolymer as claimed in claim 6.

8. An injection moldable polyamide copolymer comprising about 1 to about 10 percent phthalic anhydride moieties and comprising recurring polyamide-imide A' units of

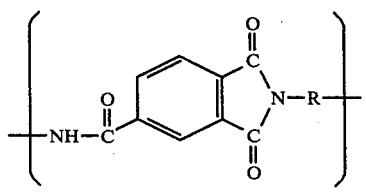

and polyamide B units of

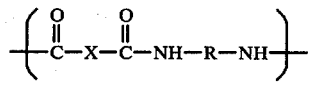

wherein the molar ratio of A' units to B units is about 80 to 20 to 20 to 80, and wherein R is a divalent aromatic hydrocarbon radical of from 6 to about 20 carbon atoms or 2 divalent hydrocarbon radicals of from about 6 to 20 carbon atoms joined directly or by stable linkages selected from the group consisting of —O—, methylene, —CO—, —SO₂— and —S— radicals and X is a divalent aromatic radical.

9. The composition of claim 8 wherein the molar ratio of A and A' to B units is about 1 to 1.

10. A polyamide-imide molding composition comprising about 1 to about 10 percent by weight of phthalic anhydride moieties suitable for injection molding and forming shaped articles comprising recurring A' units of

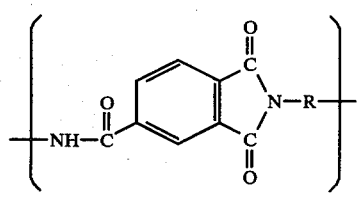

and polyamide B units of

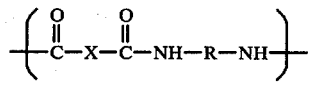

wherein the molar ratio of A' units to B units is about 80 to 20 to 20 to 80, and the molding composition contains from about 30 to 50 weight percent of glass fibers, glass beads or a mixture thereof and R is a divalent aromatic hydrocarbon radical of from 6 to about 20 carbon atoms or 2 divalent hydrocarbon radicals of from about 6 to 20 carbon atoms joined directly or by stable linkages selected from the group consisting of —O—, methylene, —CO—, —SO₂— and —S— radicals and X is a divalent aromatic radical.

11. The composition of claim 10 wherein the molding composition contains from about 30 to about 50 weight percent of glass fibers, glass beads or a mixture thereof.

12. The composition of claim 10 wherein R is

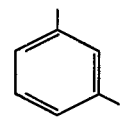

and X is

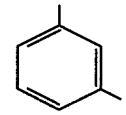

13. A shaped article comprising reinforced polyamide copolymer as claimed in claim 10.

14. A molding composition suitable for injection molding comprising about 1 to about 10 percent phthalic anhydride and at least about 70 weight percent of a polymer prepared by polymerizing the 4 acyl chloride derivative of trimellitic acid anhydride, the acyl chloride derivative of isophthalic acid and meta-phenylene diamine, and wherein the molding composition contains from about 30 to 50 weight percent of glass fibers, glass beads or a mixture thereof.

15. Shaped article comprising reinforced polymer as claimed in claim 14.

16. A process for improving the flow properties of polyamide copolymer comprising about 1 to about 10 percent phthalic anhydride moieties, and comprising recurring polyamide A units of

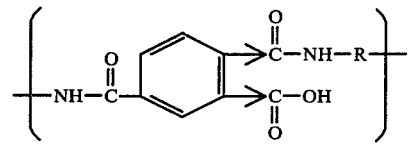

capable of undergoing imidization wherein → denotes isomerization, and polyamide B units of

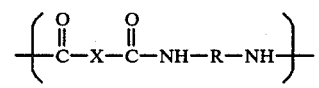

wherein the molar ratio of A units to B units is about 80 to 20 to about 20 to 80, and wherein R is a divalent aromatic hydrocarbon radical of from about 6 to about 20 carbon atoms or 2 divalent hydrocarbon radicals of from about 6 to about 20 carbon atoms joined directly or by stable linkages selected from the group consisting of —O—, methylene, —CO—, —SO₂— and —S— radicals, and X is a divalent aromatic radical.

17. The process of claim 16, wherein the anhydride halide is 4-trimellitoyl anhydride chloride and the acid halide is isophthaloyl dichloride.

18. The process of claim 16, wherein a nitrogen containing organic polar solvent is employed.

19. The process of claim 17, wherein a nitrogen containing organic polar solvent is employed.

* * * * *

UNITED STATES PATENT OFFICE
CERTIFICATE OF CORRECTION

Patent No. 4,448,925　　　　　　　　　　Dated May 15, 1984

Inventor(s) HANSON, ROBERT B.

It is certified that error appears in the above-identified patent and that said Letters Patent are hereby corrected as shown below:

| Column | Line | |
|---|---|---|
| 1 | 31 | "isophthalimides" should be --isophthalamides-- |
| 2 | 5 | "20" should be -- 10 -- |
| 2 | 53 | "are" should be -- as -- |
| 6 | 50 | "Tensile psi" should be -- Tensile, psi -- |

Signed and Sealed this

Thirtieth Day of April 1985

[SEAL]

Attest:

DONALD J. QUIGG

Attesting Officer　　　Acting Commissioner of Patents and Trademarks